(12) United States Patent
Kurihara et al.

(10) Patent No.: US 7,983,137 B2
(45) Date of Patent: Jul. 19, 2011

(54) METHOD AND APPARATUS FOR PROCESSING OPTICAL DISC SIGNAL

(75) Inventors: Kazuma Kurihara, Tsukuba (JP); Takashi Nakano, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 70 days.

(21) Appl. No.: 12/599,659

(22) PCT Filed: Mar. 11, 2008

(86) PCT No.: PCT/JP2008/054360
§ 371 (c)(1),
(2), (4) Date: Nov. 10, 2009

(87) PCT Pub. No.: WO2008/139773
PCT Pub. Date: Nov. 20, 2008

(65) Prior Publication Data
US 2010/0214897 A1    Aug. 26, 2010

(30) Foreign Application Priority Data

May 11, 2007    (JP) .................................. 2007-126398

(51) Int. Cl.
*G11B 20/10*    (2006.01)
(52) U.S. Cl. ............... 369/124.12; 369/59.2; 369/59.15; 369/53.31; 369/124.15
(58) Field of Classification Search ............... 369/59.15, 369/59.17, 59.2, 59.21, 59.26, 124.01, 124.1–124.12, 369/124.14, 124.15, 53.31
See application file for complete search history.

(56) References Cited

U.S. PATENT DOCUMENTS

| 5,530,641 | A | * | 6/1996 | Kanehira | ................. | 369/109.02 |
| 5,953,289 | A | * | 9/1999 | Miyaoka | .................... | 369/13.24 |
| 6,058,077 | A | * | 5/2000 | Miyaoka | .................... | 369/13.24 |
| 6,246,641 | B1 | * | 6/2001 | Miyaoka | .................... | 369/13.05 |
| 7,020,049 | B2 | * | 3/2006 | Suzuki et al. | ............. | 369/13.26 |
| 7,830,766 | B2 | * | 11/2010 | Kasahara | .................. | 369/59.22 |
| 2004/0228244 | A1 | | 11/2004 | Kim et al. | | |
| 2004/0264333 | A1 | * | 12/2004 | Chang et al. | ................ | 369/59.2 |
| 2005/0190670 | A1 | * | 9/2005 | Kim et al. | .................... | 369/47.5 |
| 2006/0077765 | A1 | * | 4/2006 | Kim et al. | .................. | 369/13.01 |
| 2007/0153648 | A1 | * | 7/2007 | Lee et al. | ..................... | 369/47.5 |
| 2007/0237059 | A1 | * | 10/2007 | Kasahara | .................. | 369/124.1 |

FOREIGN PATENT DOCUMENTS

| JP | 6486367 | A | 3/1989 |
| JP | 5135313 | A | 6/1993 |
| JP | 200274735 | A | 3/2002 |
| JP | 2005302095 | A | 10/2005 |
| JP | 2006519456 | A | 8/2006 |
| JP | 2007087494 | A | 4/2007 |

* cited by examiner

*Primary Examiner* — Thang V Tran
(74) *Attorney, Agent, or Firm* — Volpe and Koenig, P.C.

(57) ABSTRACT

According to the present invention, whether recoding pits are larger or smaller than diffraction limit is determined. Then, a signal process suitable for processing of the recording pits larger than the diffraction limit and a signal process suitable for processing of the recording pits smaller than diffraction limit are divided to divisionally perform equalizer processing. The respective signals subjected to the divisional processing are synthesized to obtain a processed output signal. A reproduction signal with reduced impact of intersymbol interference is thus obtained.

7 Claims, 7 Drawing Sheets

METHOD AND APPARATUS FOR PROCESSING OPTICAL DISC SIGNAL

FIELD OF INVENTION

The present invention relates to a signal processing method and apparatus for reading reproduction signals using an optical disk recording/reproducing apparatus comprising a photodetector composed including a light receiving element divided into at least two portions.

BACKGROUND

Two reproduction effects are involved in a reproduction from a super-resolution optical disk having recording bits equal to or smaller than diffraction limit and recording pits equal to or larger than diffraction limit. One of the effects is an optical signal reproduction effect similar to that of a conventional reproduction scheme for optical disks such as CDs, DVDs, Blu-Ray disks, and HD-DVDs which contribute to the recording pits equal to or larger than diffraction limit. The other is a super-resolution reproduction effect used for reproduction from the recording pits equal to or smaller than diffraction limit. Thus, depending on a pit pattern for recording, the above-described reproduction effects may be synthesized to cause intersymbol interference between the recording pits, which is reflected in the reproduction signal. Then, disadvantageously, determining the symbol of the recording pit pattern based on the reproduction signal becomes difficult, thus reducing bit error rate. Consequently, in order to solve this problem, an array or an arrangement method for recording pit patterns which enables a reduction in the impact of intersymbol interference (for example, Patent Document 1), or for example, a Viterbi determination circuit configured to take the intersymbol interference into account (see Patent Document 2) is used.

However, in the array or arrangement method for recording pit patterns which enables a reduction in intersymbol interference, the effect of the reduction in the intersymbol interference by the arrangement method is limited. Furthermore, in a reduction in intersymbol interference based on the symbols used for recording patterns, recording density may disadvantageously decrease. On the other hand, when the Viterbi determination circuit is used for example that is configured to take into account the intersymbol interference in reproduction signals from a super-resolution optical disk having a mixture of recording pits equal to or smaller than diffraction limit and recording pits equal to or larger than diffraction limit, the number of clocks required for Viterbi determination is equal to time required for a light beam to travel over a distance corresponding to a radius size divided by the period time of one clock. This increases the amount of a determination circuit for the Viterbi determination, thus significantly increasing loads on memories and a CPU for optical disk signal processing. Thus, a signal processing circuit of a large capacity is disadvantageously required.

Patent Document 1: Japanese Patent Laid-Open No. 2007-087494

Patent Document 2: Japanese Patent Laid-Open No. 2005-302095

SUMMARY

An object of the present invention is to solve the above-described problems and to provide a signal processing method for solving the problems. The method enables, in a super-resolution optical disk having recording pits equal to or larger than diffraction limit and recording pits equal to or smaller than diffraction limit, determining whether the recording pit is smaller or larger than the diffraction limit, processing filter gain characteristics and the like based on the result of the determination, and performing signal synthesis to obtaining a reproduction signal with the impact of intersymbol interference being reduced.

The present invention provides a signal processing method and apparatus for an optical disk. In particular, the present invention provides a method for processing a reproduction signal from an optical disk detected by a photodetector. The method comprises determining whether recoding pits are larger or smaller than diffraction limit with respect to the detected reproduction signal, dividing a signal process suitable for the processing of the recording pits larger than diffraction limit and a signal process suitable for the processing of the recording pits smaller than diffraction limit to divisionally perform equalizer processing, and synthesizing signals subjected to the divisional processing to obtain a processed output signal.

The present invention allows the equalizer processing to be carried separately on the reproduction signals obtained from the recording pits equal to or larger than diffraction limit and from the recording pits equal to or smaller than diffraction limit. Thus, an optical reproduction signal can be separated from a reproduction signal resulting from a super-resolution effect so that waveform equalization processing can be carried out on the respective reproduction signals. This enables a reduction in intersymbol interference between the recording pits. Furthermore, the reduced intersymbol interference enables a reduction in loads on memories and a CPU for a super-resolution optical disk comprising recording pits equal to or smaller than diffraction limit and recording pits equal to or larger than diffraction limit. Additionally, bit error rate characteristics can be improved.

DETAILED DESCRIPTION OF THE PREFERRED EMBODIMENTS

A preferred embodiment of the present invention will be described below with reference to the attached drawings. The present invention provides a method comprising determining whether recoding pits are larger or smaller than diffraction limit, dividing a signal process suitable for the processing of the recording pits larger than diffraction limit and a signal process suitable for the processing of the recording pits smaller than diffraction limit to divisionally perform equalizer processing, and finally synthesizing the divided signals to obtain a synthesized reproduction signal, thus reducing the impact of intersymbol interference. Here, it is now necessary to determine, based on the reproduction signals resulting from the reproduction of recording pits, whether each of the recording pits is larger or smaller than diffraction limit. Such determination of whether the recording pit is larger or smaller than diffraction limit is based on whether there is a phase difference between at least two reproduction signals obtained from a photodetector composed of a light receiving element divided into at least two portions in a tangential direction, or on the level of the phase difference.

Figure 1A:
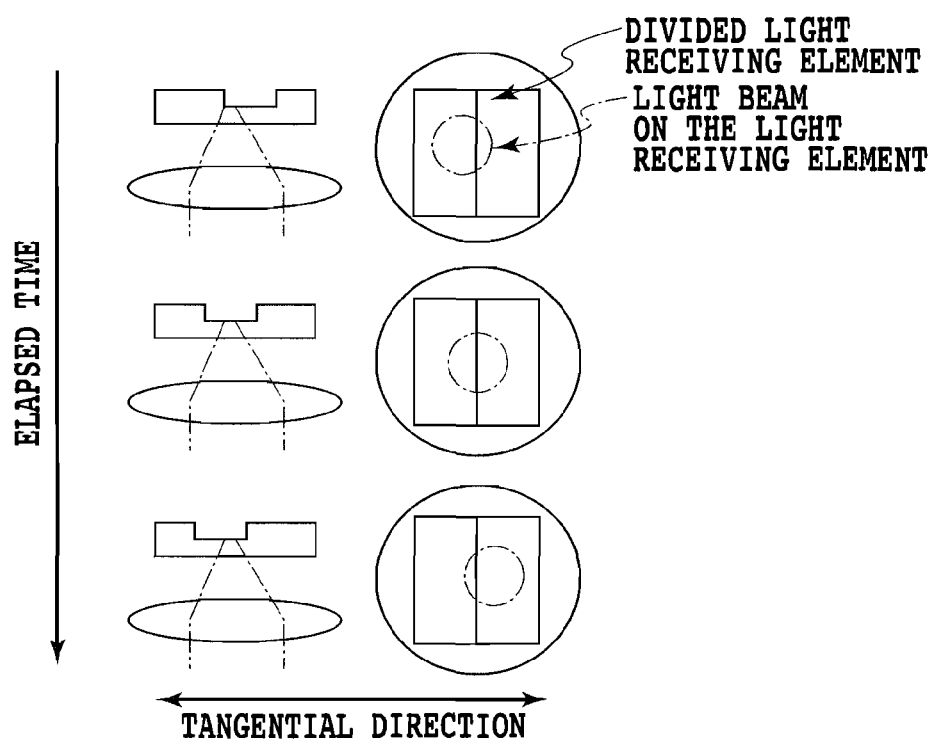
FIG. 1A is a diagram illustrating a method of determining whether a recording pit is smaller or larger than diffraction limit in a case where a light spot passes through a recording pit equal to or larger than diffraction limit.
Figure 1B:
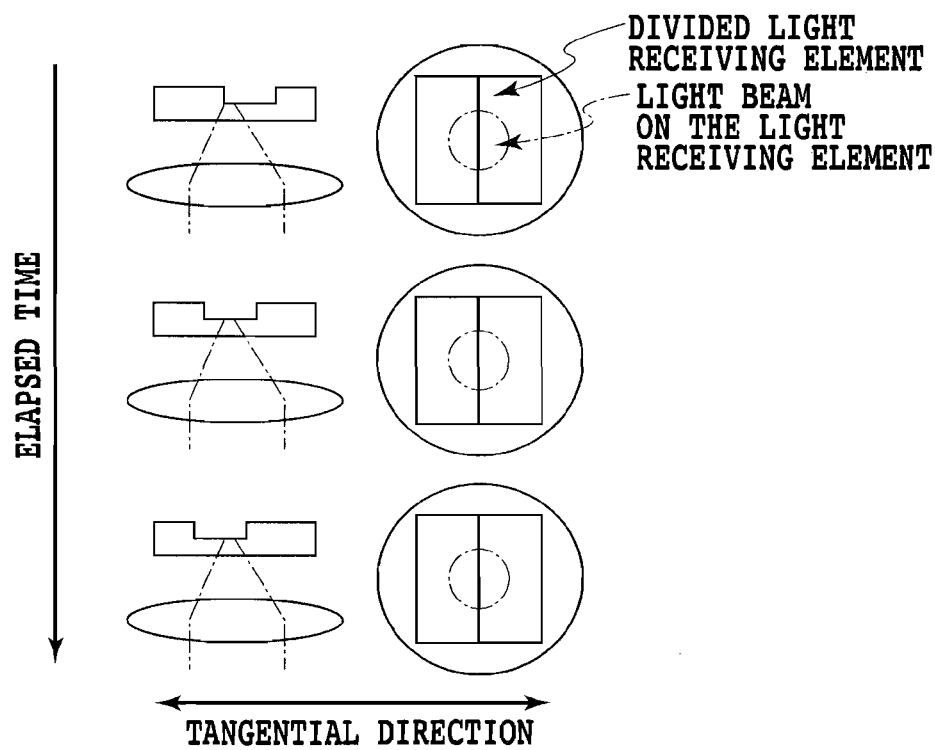
FIG. 1B is a diagram illustrating a method of determining whether a recording pit is smaller or larger than diffraction limit in a case where a light spot passes through a recording pit equal to or smaller than diffraction limit.

FIGS. 1A and 1B are diagrams illustrating a method of determining whether a recording pit is smaller or larger than diffraction limit. FIG. 1A is a case where a light spot passes through a recording pit equal to or larger than diffraction limit. FIG. 1B is a case where a light spot passes through a recording pit equal to or smaller than diffraction limit. In both figures, the light spot is assumed to move from left to right in the tangential direction. Here, regarding a recording pit larger or smaller than diffraction limit, the diffraction limit can be defined as $\lambda/2NA$ where $\lambda$ is wavelength and NA is the numerical aperture of an objective lens.

As shown in FIG. 1A, if a recording pit equal to or larger than diffraction limit is scanned by a light spot, a 1st-order diffraction wave is generated based on diffraction theory. Here, a light beam is reflected. Depending on the locational relationship between the recording pit equal to or larger than diffraction limit and the focused light spot, the 1st order diffraction wave of the reflected light is deflected in the tangential direction. The reflected light spot reciprocates over a detector divided into at least two portions in the tangential direction. A phase difference occurs between at least two reproduction signals detected by the light receiving element divided in the tangential direction. Furthermore, the level of the phase difference varies depending on the recording pit size.

On the other hand, as shown in FIG. 1B, when a light spot passes through a recording pit equal to or smaller than diffraction limit, no 1st-order diffraction wave is generated based on the diffraction theory. Thus, the reflected light is prevented from reciprocating over the detector divided into at least two portions in the tangential direction. No phase difference occurs between at least two reproduction signals detected by the light receiving element divided in the tangential direction. Consequently, by determining whether there is any phase difference between at least two reproduction signals detected by the photodetector composed of the light receiving element divided into at least two portions in the tangential direction, or determining the level of the phase difference, whether the recording pit larger or smaller than diffraction limit can be determined.

Figure 2A:
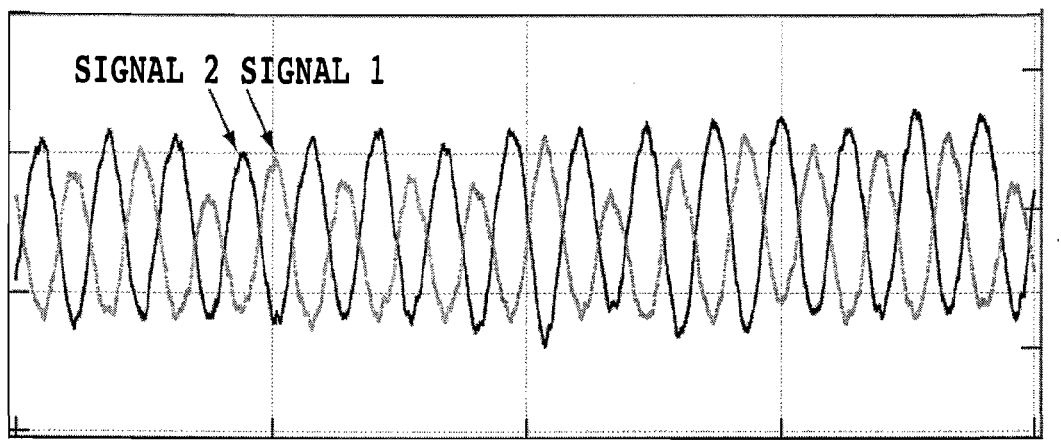
FIG. 2A is a graph showing the results of measurement of two reproduction signals for a super-resolution optical disk composed only of recording pits equal to or larger than diffraction limit.
Figure 2B:
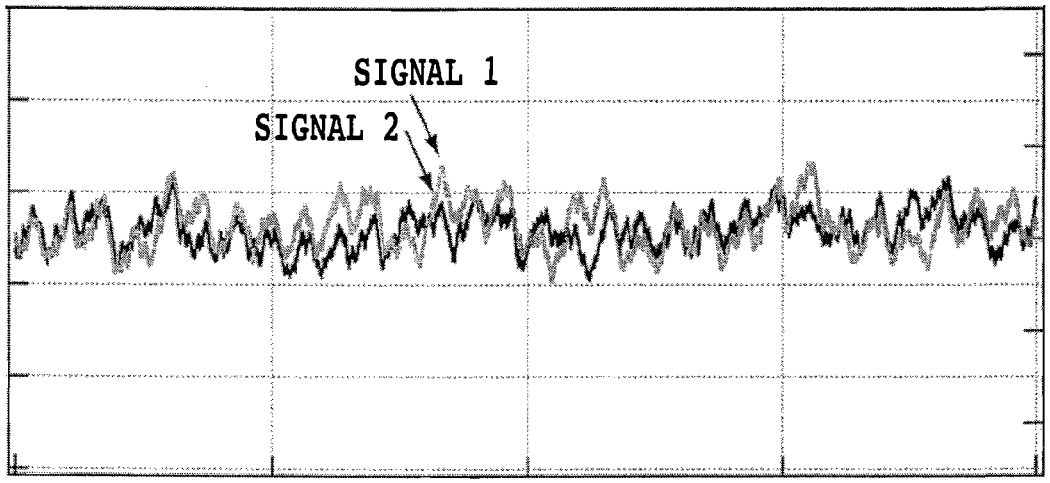
FIG. 2B is a graph showing the results of measurement of two reproduction signals for a super-resolution optical disk composed only of recording pits equal to or smaller than diffraction limit.
Figure 2C:
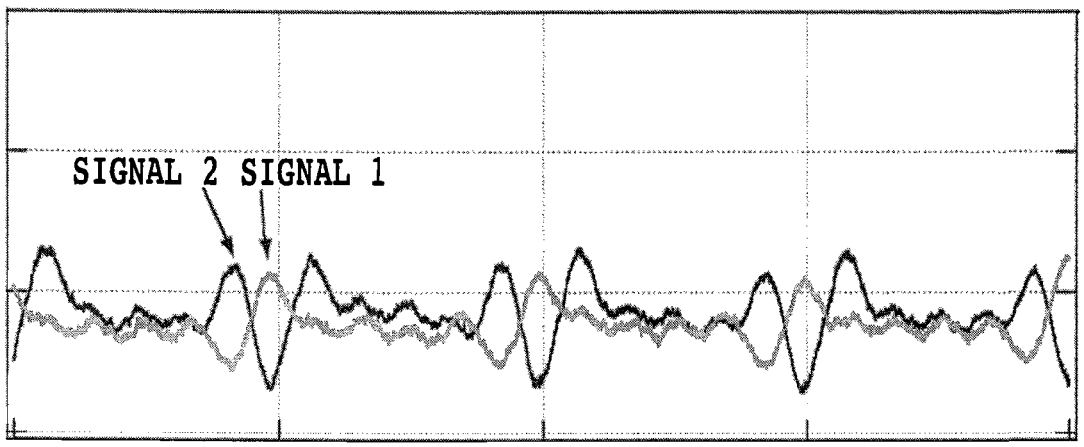
FIG. 2C is a graph showing the results of measurement of two reproduction signals for a super-resolution optical disk composed of a combination of recording pits equal to or larger than diffraction limit and recording pits equal to or smaller than diffraction limit.

FIGS. 2A, 2B and 2C show the results of measurement of two reproduction signals obtained from the photodetector composed of the light receiving element divided into two portions in the tangential direction. FIG. 2A shows a super-resolution optical disk composed only of recording pits equal to or larger than diffraction limit. FIG. 2B shows a super-resolution optical disk composed only of recording pits equal to or smaller than diffraction limit. FIG. 2C shows a super-resolution optical disk composed of a combination of recording pits equal to or larger than diffraction limit and recording pits equal to or smaller than diffraction limit. As seen in FIG. 2A showing the optical disk composed only of the recording pits equal to or larger than diffraction limit, a phase difference occurs between two reproduction signals 1 and 2 obtained from the respective portions of the light receiving element divided into two portions under the impact of a 1st order diffraction wave of reflected light. On the other hand, as seen in the graph of the optical disk composed only of the recording pits equal to or smaller than diffraction limit (FIG. 2B), no 1st order diffraction wave of the reflected light is generated, preventing a phase difference between the two reproduction signals 1 and 2 obtained from the photodetector composed of the light receiving element divided into two portions in the tangential direction. Furthermore, as seen in the graph of the super-resolution optical disk composed of the combination of the recording pits equal to or larger than diffraction limit and the recording pits equal to or smaller than diffraction limit (FIG. 2C), phase differences occur only at the recording pit portions equal to or larger than diffraction limit. Thus, in the signal processing on the super-resolution optical disk composed of the combination of the recording pits equal to or larger than diffraction limit and the recording pits equal to or smaller than diffraction limit, it is shown that the detection of a phase difference enables determination of whether each of the recording pits is smaller or larger than diffraction limit.

Figure 3:
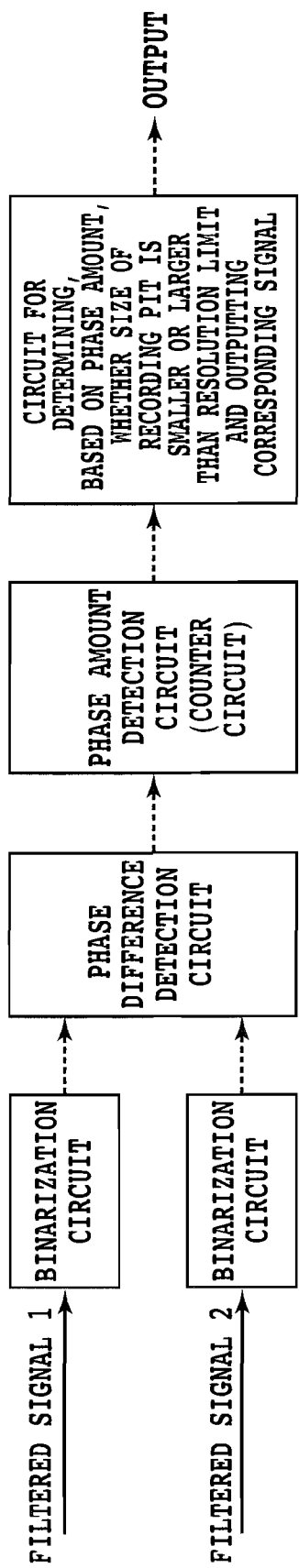
FIG. 3 is a block diagram of a determination circuit determining whether the recording pit is larger or smaller than diffraction limit.

FIG. 3 is a block diagram of a determination circuit determining whether a recording pit is larger or smaller than diffraction limit based on a signal for a phase difference error between two signals. The determination circuit shown in FIG. 3 comprises binarization circuits for clock extraction, a phase difference detection circuit, a phase difference amount detection circuit, and a determination circuit (which determines whether the size of the recording pit is larger or smaller than resolution limit based on the phase amount and outputs the corresponding signal). The determination circuit corresponds to a phase comparison, a phase difference amount detection, and determination circuit shown in FIG. 4. Two reproduction signals obtained from the detector composed of the light receiving element divided into two portions in the tangential direction are passed through respective binarization circuits to extract clock signals. The existence of a phase difference between the two clock signals or the level of the phase difference is then detected. At the same time, the phase difference amount detection circuit is used to count a phase difference amount based on the difference between the two clock signals. A signal for the level of the phase difference is detected which indicates the degree by which the phase of a light reception signal generated by one side of the light receiving element in the tangential direction precedes the phase of a light reception signal generated by the other side of the light receiving element. Based on the measured phase difference amount, the circuit determining whether the size of a pit is smaller or larger than the resolution limit and outputting the corresponding signal is used to determine whether the size of a pit is smaller than the resolution limit and to output a determination signal. For example, if the pit is smaller than the resolution limit, the circuit outputs an H level, and if it is larger than the resolution limit the circuit outputs an L level.

Figure 4:
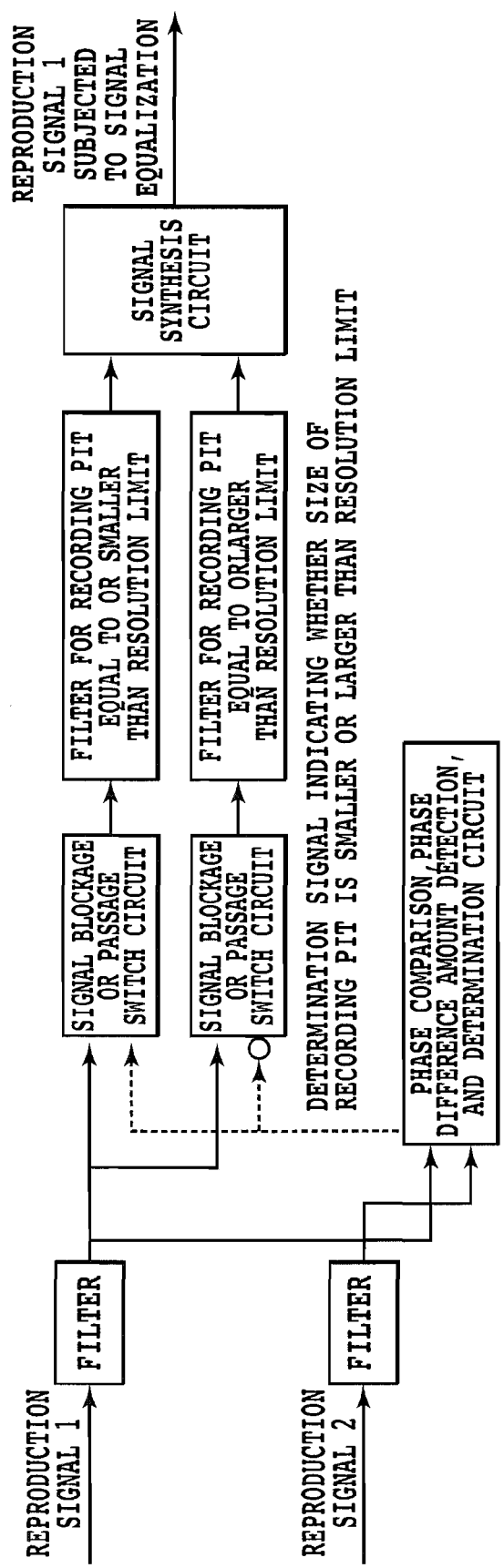
FIG. 4 is a block diagram of a circuit for waveform equalization which uses separate equalizers to carry out signal processing on a recording pit equal to or larger than diffraction limit and a recording pit equal to or smaller than diffraction limit.

FIG. 4 is a block diagram for signal processing and waveform equalization using the circuit of FIG. 3 and separate filters for a recording pit equal to or larger than diffraction limit and a recording pit equal to or smaller than diffraction limit. The term "filter" as used herein includes a gain circuit for adjusting the amplitude of a signal, an applied filter for correcting filter characteristics, and the like. That is, the filter is arranged so as to perform equalizer processing with a gain adjustment circuit and a filter characteristic circuit. Reproduction signals 1 and 2 obtained from the respective elements of the two-piece light receiving element are passed through the respective filters for waveform equalization. Then, the determination signal obtained in FIG. 3 and respective signal blockage or passage switch circuits are used to block or pass the reproduction signal 1. Here, the phase comparison, phase difference amount detection, and determination circuit provides a signal indicating whether the size of a pit is smaller or larger than the resolution limit. Thus, the reproduction signal 1 is divided into a signal composed of pits smaller than the super-resolution and a signal composed of pits larger than the super-resolution. The resulting divided signals pass through respective filters optimally designed for pit bands smaller and larger than the resolution limit using a filter for pits smaller than the resolution limit and a filter for pits larger than the resolution limit. Finally, the signal synthesis circuit is used to synthesize the reproduction signals 1 into one signal.

Figure 5A:
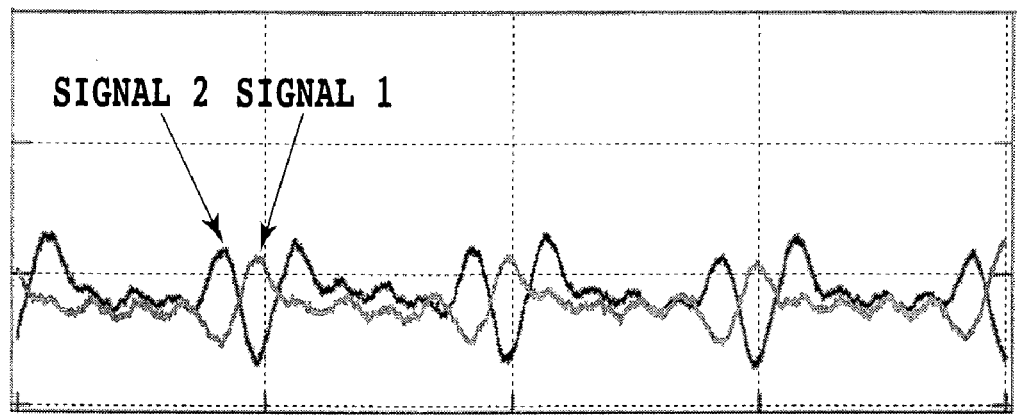
FIG. 5A is the results for two original reproduction signals obtained from the light receiving element divided into the two portions in the tangential direction (as in the case of FIG. 2C)
Figure 5B:
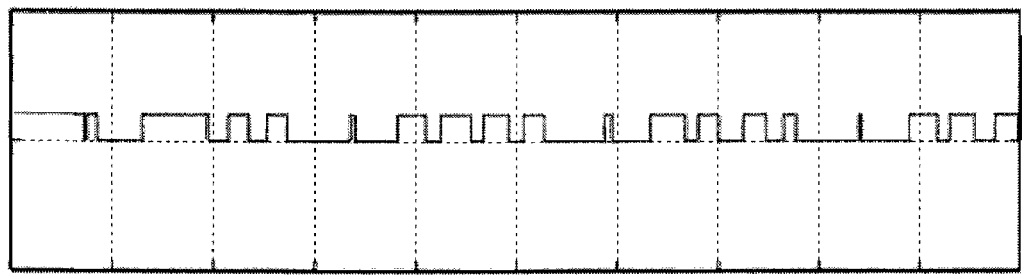
FIG. 5B shows a signal indicating whether there is a phase difference between two reproduction signals generated by the block circuit shown in FIG. 3.
Figure 5C:
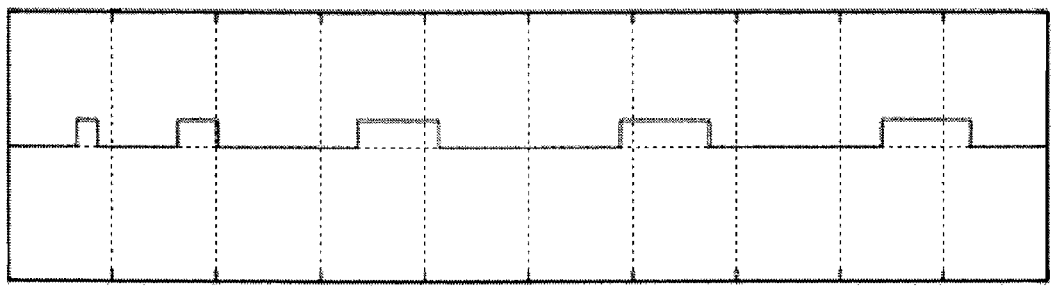
FIG. 5C shows a determination signal indicating whether the recording pit generated from the phase difference signal generated in FIG. 5B and a reference clock is larger or smaller than diffraction limit.

FIGS. 5A, 5B and 5C show the results of waveform equalization using the signal processing blocks shown in FIGS. 3 and 4 and a super-resolution optical disk including recording pits equal to or smaller than diffraction limit and recording pits equal to or larger than diffraction limit. FIG. 5A shows the results for two original reproduction signals obtained from the light receiving element divided into the two portions in the tangential direction (as in the case of FIG. 2C). FIG. 5B shows a signal indicating whether there is a phase difference between two reproduction signals generated by the block circuit shown in FIG. 3. FIG. 5C shows a determination signal indicating whether the recording pit generated from the phase difference signal generated in FIG. 5B and a reference clock is larger or smaller than diffraction limit.

Figure 6A:
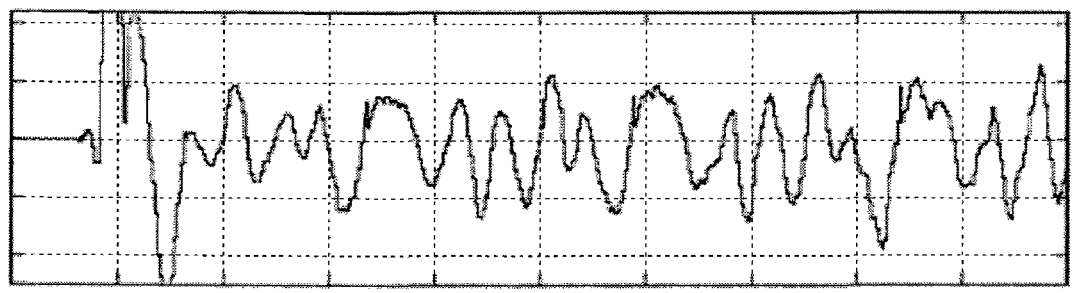
FIG. 6A shows the result of waveform synthesis following waveform equalization using two separate equalizers on signals divided based on the determination signal obtained in FIG. 5C.
Figure 6B:
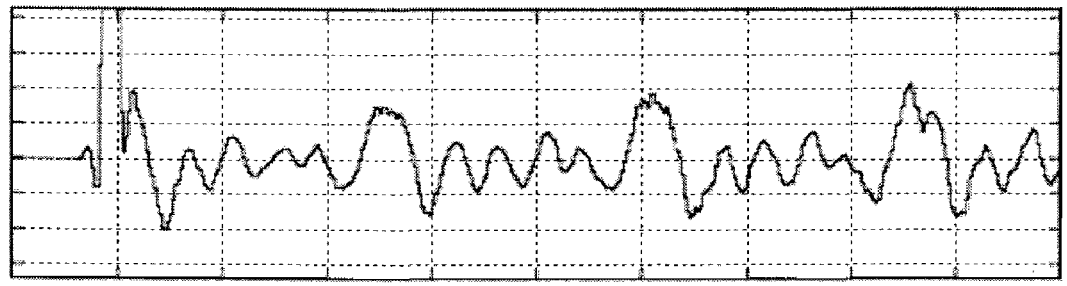
FIG. 6B shows a waveform obtained without using the present invention.

FIG. 6A shows the result of waveform synthesis following waveform equalization using two separate equalizers on signals divided based on the determination signal obtained in FIG. 5C. FIG. 6B shows a waveform obtained without using the present invention. As indicated by a comparison of FIG. 6A showing the case where the signal processing according to the present invention is used with FIG. 6B showing the case where the signal processing according to the present invention is not used, the recording pit equal to or smaller than diffraction limit is highlighted, reducing the impact of intersymbol interference.

As described above, in the signal processing of a super-resolution optical disk with recording pits equal to or smaller than diffraction limit and recording pits equal to or larger than diffraction limit, it is shown that the signal processing circuit and method according to the present invention enables a reduction in the impact of intersymbol interference and thus effective.

The invention claimed is:

1. A method for processing a reproduction signal from an optical disk detected by a photodetector, the method comprising:
   determining whether recoding pits are larger or smaller than diffraction limit based on the detected reproduction signal;
   dividing a signal process suitable for processing of the recording pits larger than the diffraction limit and a signal process suitable for processing of the recording pits smaller than diffraction limit to divisionally perform equalizer processing; and
   synthesizing respective signals subjected to divisional processing to obtain a processed output signal.

2. The method according to claim 1, wherein determination of whether the recording pits are larger or smaller than the diffraction limit is based on determination of whether there is a phase difference between at least two reproduction signals obtained from a photodetector composed of a light receiving element divided into at least two portions in a tangential direction.

3. The method according to claim 2, wherein the determination of whether there is a phase difference between the at least two reproduction signals is based on a signal which indicates a degree by which a phase of a light reception signal generated by one side of the light receiving element in the tangential direction precedes a phase of a light reception signal generated by the other side of the light receiving element.

4. An apparatus for processing a reproduction signal from an optical disk detected by a photodetector, the apparatus comprising:
   a circuit determining whether recoding pits are larger or smaller than diffraction limit based on the detected reproduction signal;
   a circuit dividing a signal process suitable for processing of the recording pits larger than the diffraction limit and a signal process suitable for processing of the recording pits smaller than diffraction limit to divisionally perform equalizer processing; and
   a circuit synthesizing respective signals subjected to divisional processing to obtain a processed output signal.

5. The apparatus according to claim 4, wherein determination of whether the recording pits are larger or smaller than the diffraction limit is based on determination of whether there is a phase difference between at least two reproduction signals obtained from a photodetector composed of a light receiving element divided into at least two portions in a tangential direction.

6. The apparatus according to claim 5, wherein the determination of whether there is a phase difference between the at least two reproduction signals is based on a signal which indicates a degree by which a phase of a light reception signal generated by one side of the light receiving element in the tangential direction precedes a phase of a light reception signal generated by the other side of the light receiving element.

7. The apparatus according to claim 4, wherein the circuit for divisional equalizer processing comprises a filter and a gain adjustment circuit which are preset for respective divisional signal processes.

* * * * *